Patented Jan. 13, 1942

2,269,508

UNITED STATES PATENT OFFICE 2,269,508

ZINC ALUMINATE PIGMENT AND PAINT AND METHOD OF MAKING SAME

Louis E. Barton, Windsor, Conn.

No Drawing. Application March 16, 1939, Serial No. 262,175

12 Claims. (Cl. 23—52)

My invention relates generally to pigments, their preparation and application, and more specifically to a new and improved type of white pigment—the aluminate of zinc—together with improved methods of making same and their application in paints.

In my co-pending application for patent Serial Number 41,867 filed in the U. S. Patent Office September 24, 1934, I have described an improved method of making white aluminates of certain metallic elements, which may be summarized as consisting in heating an intimately blended mixture containing an oxide of the metallic element and the oxide of aluminum to a temperature sufficiently high to form the aluminate, but without fusion of the charge.

In my co-pending application for patent Serial Number 142,878 filed in the U. S. Patent Office May 15, 1937, of which this application is a continuation-in-part, I have described a process of preparing zinc aluminate pigments which, briefly described, consists in heating a mixture of gamma aluminum oxide and zinc oxide in a temperature range of 850 to 1500° C. to formation of zinc aluminate in the solid phase. In my application referred to it was stated that zinc aluminate can be made at temperatures below 850° C. and also that zinc aluminates can be prepared which contain proportions of zinc and aluminum oxides other than indicated by the formulae $ZnAl_2O_4$ and $Zn_2Al_2O_5$, but examples of such lower temperature and variations in proportions were not given. It is the object of this application to show the working of my process in the preparation of zinc aluminates of various compositions and the effect of preparing them at various temperatures.

The synthesis of the mineral gahnite or zinc spinel, while accomplished by several independent investigators, appears to have been attended with considerable difficulty. Heating the mixture of alumina and zinc oxide in the presence of a salt or compound to act as a mineralizer and assist in the development of crystal form appears to have been the usual practice.

S. Meunier synthesized gahnite by heating a mixture of alumina, zinc oxide, cryolite and aluminum chloride. Ebelmen's method of synthesizing gahnite, which has been used by others, consists in heating a mixture of zinc oxide, alumina and boric oxide to a very high temperature and prolonging the heating, after formation of the mineral, to finally volatilize the boric oxide. Ebelmen's method was used by Clark, Ally and Badger for the synthesis of zinc spinel. (See Amer. Journal of Science, Vol. 22, p. 539, 1931.)

K. Hild (See Z. physik Chem. A161, 305–14, 1932) has shown that it is possible to synthesize zinc spinel by heating a mixture of zinc oxide and "alpha" aluminum oxide ("electro corundum"), without mineralizers, for a prolonged period at a high temperature. Hild appears to have been the first to thoroughly investigate the nature and course of the reaction in the formation of zinc spinel and has described the synthesis in detail in the publication referred to. Hild states, and shows by X-ray photographs, that there is no formation of zinc spinel below 975° C. At a temperature a little above 975° C. the reaction starts but proceeds very slowly. If the temperature is further increased above 975° C. then the reaction barely goes further and even heating at 1050° C. for 66 hours converted only about half of the oxide to spinel. Hild observed that the reaction became particularly strong at about 1400° C. and he was able to convert a mixture of the oxides of zinc and aluminum to zinc spinel in two hours at a temperature of 1600° C.

Evidently it is necessary in the synthesis of zinc spinel, duplicating the natural mineral, to use aluminum oxide having the crystal form of corundum or "alpha" form of aluminum oxide and to subject an equimolecular mixture of such aluminum oxide and zinc oxide to a temperature of 1400 to 1600° C.

I am aware that zinc aluminate made as described by Hild is an excellent synthetic duplication of the mineral gahnite, or natural zinc spinel. If prepared by heating a mixture of alpha aluminum oxide and zinc oxide at 1600° C. the product is quite strongly sintered but if made at about 1400° C. it is a coarse granular product. In either case the product is characterized by its extreme hardness (gahnite is 7.5 to 8 compared with the hardness of diamond taken as 10) and, when finely ground, persistently retains its gritty texture.

I have discovered that pigmentary zinc aluminate having the same chemical composition as zinc spinel but having distinctly different physical properties can be made at temperatures far below that required in the formation of zinc spinel, if "gamma" form (See vol. I, "The Aluminum Industry" by Edwards, Frary and Jeffries) of aluminum oxide is used instead of the "alpha" or corundum form.

I have discovered that when gamma aluminum oxide, or a compound such as aluminum hydrate which yields gamma aluminum oxide upon heating, is mixed with zinc oxide and the mixture heated, the reaction to form zinc aluminate in the solid phase takes place at temperatures as low as 700° C. Zinc aluminate can be made at a temperature of 750° C., as will be shown later by examples, but the time required is excessive and therefore less economic. At 850° C. zinc aluminate is readily formed by heating for 1 to 2 hours and the reaction takes place much more rapidly in the temperature range 900 to 950°

C., the reaction requiring not more than one hour.

I have also discovered that, when using the gamma form of aluminum oxide, zinc aluminate can be made by heating to temperatures above 950° C. and as high as 1200 to 1400° C. without destroying such pigmentary physical properties as fineness, soft texture and tinting strength, which render the zinc aluminate applicable as a white opaque pigment for paint and other purposes.

I have found that the formation of zinc aluminate at the higher temperatures referred to takes place very rapidly notwithstanding that gamma aluminum oxide can be changed to the alpha form at such temperatures. The change in aluminum oxide from the gamma to the alpha form is supposed to start at about 900° C. and to be more rapid and complete at temperatures of 1200° C. and above. However the change in structure is known to be gradual, as proven by the fact that aluminum hydrate calcined at a temperature of 1200° C. will still show a little rehydration when treated with water thus indicating an incomplete conversion of the alumina to the alpha form. The formation of zinc aluminate of pigmentary quality at the higher temperature referred to is evidently attributable to the rapidity of reaction between gamma aluminum oxide and zinc oxide, so that the product is formed before any appreciable formation of alpha aluminum oxide occurs.

Pigmentary zinc aluminate prepared as described is a pure, white, fine-grained product having excellent opacity and hiding power and a soft texture suitable for use as a pigment, but the color and opacity of the pigment vary appreciably with the calcining temperature. Zinc aluminates made at a temperature below 950° C. have a cream-white tone while those heated to temperatures above 950 have a slightly whiter color and are appreciably higher in opacity. This improvement in color and opacity at higher temperatures appears to be due to a development of optimum particle size. While, as already stated, pigmentary zinc aluminate can be prepared at temperatures as high as 1400° C. if gamma aluminum oxide is used, such high temperature is unnecessary since the improvement in color and opacity can be accomplished, with greater economy, in a temperature range of 950 to 1200° C. Zinc aluminates made at the higher temperatures have the disadvantage that they are slightly aggregated and require milling to restore a soft texture. For most applications zinc aluminates made at temperatures of 900 to 950° C. are preferred. If desired, the product so prepared can be heated to a higher temperature, preferably not above 1200° C., to slightly improve color and tinting strength, or the same improvement can be conveniently and economically accomplished by first heating the mixture of zinc oxide and alumina to a temperature about 950° C. and gradually raising the temperature to any point desired. Thus the pigment is formed at the lower temperature and its physical properties modified at a higher temperature.

The course of the reaction while heating the mixture of zinc and aluminum compounds may be judged with considerable accuracy by noting the color of the charge. If the charge contains free zinc oxide it will be yellow when hot, but if the reaction is complete the charge will be white. A more accurate method, which may be made quantitative if desired, is to treat a small sample with cold 10% acetic acid. Normal zinc aluminate is insoluble while free zinc oxide will dissolve immediately. For example: after heating one charge for one hour at 850° C. about one percent of the zinc oxide dissolved when treated with cold 10% acetic acid for ½ hour. After heating for 2 hours at 850° C. no zinc oxide could be extracted.

While zinc aluminate is unquestionably a true chemical compound, as shown by its deportment when treated with acetic acid, before referred to, and has a composition substantially identical with that of zinc spinel, I have found that the specific gravity of the pigment made as described is consistently lower than that of the spinel. Thus in a series of normal zinc aluminates made at different temperatures the results were as shown in Table I. For comparison the specific gravity of a spinel prepared from "alpha" aluminum oxide (corundum structure) is included and it is also of interest to note that the specific gravity of grahnite (natural zinc aluminate) is reported in the literature as 4.58 and Clark, Ally and Badger, before referred to, found the specific gravity of zinc spinel 4.615.

*Table I*

| Product No. | Kind of alumina used | Temperature ° C. | Specific gravity |
|---|---|---|---|
| 223—1 | Dense aluminum hydrate | 850 | 4.45 |
| 223—3 | do | 1,200 | 4.45 |
| 223—4 | do | 1,400 | 4.48 |
| 225—1 | Fine aluminum hydrate | 850 | 4.38 |
| 225—3 | do | 1,200 | 4.46 |
| 225—4 | do | 1,400 | 4.50 |
| Zinc spinel. | Electro corundum | 1,500 | 4.60 |

I can also make by my process useful opaque zinc aluminate pigments having compositions other than the normal zinc aluminate, $ZnAl_2O_4$. From the standpoint of utility as opaque white pigments I have found that zinc aluminates having a zinc oxide content from 35% to 60% and the balance always aluminum oxide are satisfactory. Zinc aluminate pigments having proportions outside of this range can be made but as they contain an excessive amount of uncombined oxides they are deficient in durability when used in paints and if the aluminum oxide is in excess they are lacking in opacity.

The constitution of these zinc aluminate pigments other than the normal zinc aluminate, $ZnAl_2O_4$, is not definitely known. The normal zinc aluminate is insoluble in cold 10% acetic acid, whereas that acid dissolves much zinc oxide from zinc aluminates containing more zinc oxide than the normal compound, but the amount of zinc oxide remaining is always more than corresponds to normal zinc aluminate. Furthermore, zinc aluminates containing more zinc oxide than the normal never become perfectly white when they are at the calcination temperature thus indicating the presence of some free zinc oxide. From these observations it is probable that there is but one definite zinc aluminate—the normal compound, $ZnAl_2O_4$—and that the zinc aluminates of other compositions referred to are normal zinc aluminate containing the excess oxide either in physical combination or in the free state or both.

In the series of zinc aluminate pigments referred to, containing from 35 to 60% of zinc oxide, the various products consist preponderatingly of chemically combined zinc and aluminum oxides for, if it is assumed there is but one definite zinc aluminate, $ZnAl_2O_4$, the series of products will in no case contain less than 70% of actual zinc aluminate calculated as the normal product. In the examples of the various products to be given later, I have referred to those containing less zinc oxide than the normal product, as sub-normal zinc aluminates and to those containing more zinc oxide than the normal product, as basic zinc aluminates. By the expression "essentially pure" in the claims I refer to zinc aluminates having a zinc oxide content of 35 to 60% and consisting preponderatingly of chemically combined zinc and aluminum oxides, and containing no oxides other than zinc and aluminum except it be traces of impurities contained in the raw materials used.

In my process of making zinc aluminates I can use as a source of aluminum oxide either the aluminum oxide recognized in the literature as "gamma" form, as distinguished from the "alpha" or corundum form, or I can use any compound which upon heating yields the gamma form. For example, I can use aluminum hydrate or salts such as aluminum sulphate which decompose when heated yielding aluminum oxide.

As a source of zinc oxide I can use any of the well-known commercial grades of zinc oxide or I can use a compound of zinc which upon heating will decompose yielding the oxide. For example, zinc sulphate can be used. From the standpoint of economy and simplicity of process I prefer to use aluminum hydrate and commercial oxide of zinc.

I first thoroughly mix the materials in the required proportions either by dry-milling or, preferably, by wet-milling, thereby reducing particle size and also assuring a very close association of the ingredients. The milling may be done either in a batch or a continuous type of mill; in either case by using a porcelain or silex lining to avoid contamination of materials.

The slurry from the wet-mill is dewatered as by settling and decantation and/or filtration. Any suitable equipment may be used, such as Dorr tanks and filter presses.

If desired, the charge can be prepared in conjunction with the separation of aluminum hydrate from sodium aluminate solutions by such well-known methods as the Bayer process of seeding the aluminate solution with aluminum hydrate and agitating to precipitate the aluminum; or by precipitation of the aluminum hydrate by passing carbon dioxide gas into the solution. It is only necessary to suspend the zinc oxide in the sodium aluminate solution and precipitate the alumnum hydrate as usual while agitating the charge. The thoroughly blended mixture of aluminum hydrate and zinc oxide is then separated from the alkaline liquor and thoroughly washed. This method of preparing the mixture of material has the advantage that a thorough blend of very fine-grained particles is obtained. Under the usual conditions of precipitating aluminum hydrate by itself the process is one of crystallizing from solution and once started the grain size increases rapidly, resulting in the usual very coarse-grained commercial aluminum hydrate. Commercial zinc oxide is a very fine-grained powder and when suspended in the sodium aluminate solution presents an exceedingly large surface on which aluminum hydrate can precipitate by crystallizing at an infinite number of separate points and yielding a very fine-grained product.

The wet pulp, prepared by either of the methods outlined above, is then charged directly into the heating furnace, or it may be preliminarily dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. In furnaces where products of combustion contact the charge, a neutral or oxidizing flame should be maintained to avoid possible reduction of metallic oxides. As already indicated the time required to form zinc aluminate depends upon the temperature. For temperatures above 850° C. one to two hours' calcining is sufficient.

My zinc aluminates are ordinarily sufficiently fine and of such texture, as discharged from the calcining furnace, to enable them to be used as pigments for paint and other purposes, but if higher temperatures such as before referred to have been used the product may require milling to break down aggregates and develop the desired texture.

Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates.

To illustrate the workings of my process the following record of operations is given, but it will be understood that the process is not limited to the details here set forth, but may be varied as indicated in the foregoing general description, EXAMPLE 1.—*Normal zinc aluminate* $ZnAl_2O_4$ A mixture of 81.4 parts of zinc oxide and 157 parts of aluminum hydrate, equivalent to 102 parts of $Al_2O_3$, was thoroughly blended by wet-milling for 1 hour and the charge then dewatered and dried. The dried mixture was then calcined for 2 hours at a temperature of 850 to 950° C. The calcined product was a white pigment having a cream undertone and a soft texture suitable for use as a pigment. It had a particle size ranging from 0.3 to 3.5 microns and consisting preponderatingly of particles of less than 1 micron. The oil absorption was 39 parts oil per 100 parts of pigment and its tinting-strength was 50 compared to standard white lead taken as 100. After wet-milling and drying the calcined pigment its oil absorption was 29 and its tinting-strength 60. Specific gravity—4.38

Chemical composition:

| | Per cent |
|---|---|
| Zinc oxide | 44.20 |
| Aluminum oxide | 55.80 |

EXAMPLE 2.—*Normal zinc aluminate* $ZnAl_2O_4$

A mixture of 81.4 parts of zinc oxide and 157 parts of aluminum hydrate, equivalent to 102 parts of $Al_2O_3$, was thoroughly blended by wet-milling for 1 hour and the charge then dewatered and dried. The dried charge was then calcined. A period of about 2 hours was used to raise the temperature from 925° C. to 1400° C. and that temperature maintained for one hour longer. As discharged from the furnace the pigment had pure white color, an oil absorption of 30 parts of oil to 100 parts of pigment and a tinting-strength of 70 compared to standard white lead taken as 100. The product after wet-milling to break down aggregates and drying had an average particle size of less than 1 micron, an oil absorption of 20, a tinting-strength of 75 and a specific gravity of 4.48.

EXAMPLE 3.—*Normal zinc aluminate* $ZnAl_2O_4$

To a solution of sodium aluminate containing 102 parts of alumina ($Al_2O_3$) in 200 parts of water was added 81.4 parts of zinc oxide and carbon dioxide gas passed into the solution while agitating until the alumina was completely precipitated. The mixed precipitates, which was in very finely divided form, was separated by filtration, washed with water until free from alkali and dried. The dry mixture was calcined for 2 hours at 850 to 950° C. then wet-milled and dried. The pigment was very white, had excellent fine texture, oil absorption 22 parts per 100 parts of pigment and tinting-strength of 80 compared with standard white lead taken as 100.

EXAMPLE 4.—*Basic zinc aluminate*

A mixture of 163 parts of zinc oxide and 157 parts of aluminum hydrate, equivalent to 102 parts of $Al_2O_3$, was thoroughly blended by wet-milling for 1 hour and the charge dewatered and dried. The dried charge was calcined for 4 hours at a temperature of 950° C. The product was very white, and had a fine, soft texture. The oil absorption was 27 parts of oil per 100 parts of pigment and tinting-strength equal to that of standard white lead taken as 100. Specific gravity, 4.89.

Chemical composition:

| | Per cent |
|---|---|
| Zinc oxide | 61.50 |
| Aluminum oxide | 38.50 |

EXAMPLE 5.—*Basic zinc aluminate*

A mixture of 163 parts of zinc oxide and 157 parts of aluminum hydrate, equivalent to 102 parts of $Al_2O_3$, was thoroughly blended by wet-milling for 1 hour and the charge dewatered and dried. The mixture was then calcined during which the temperature was raised over a period of two hours from 925° C. to 1200° C. and then maintained at 1200° C. for one hour longer. The product was wet-milled for one hour, then dewatered and dried. The pigment had a specific gravity of 4.95; an excellent soft texture; oil absorption 23 parts per 100 parts of pigment and tinting-strength 105 compared with standard white lead taken as 100.

EXAMPLE 6.—*Basic zinc aluminate*

A mixture of 55 parts of zinc oxide and 69.2 parts of aluminum hydrate, equivalent to 45 parts of aluminum oxide, was thoroughly blended by dry-milling. The mixture was then calcined for 2 hours at a temperature of 950° C. to 975° C.

Chemical composition:

| | Per cent |
|---|---|
| Zinc oxide | 55 |
| Aluminum oxide | 45 |

The pigment had a cream white color, soft texture and a tinting-strength of 70 compared with white lead standard taken as 100.

EXAMPLE 7.—*Sub-normal zinc aluminate*

A mixture of 35 parts of zinc oxide and 100 parts of aluminum hydrate, equivalent to 65 parts of aluminum oxide, was thoroughly blended by dry-milling. The mixture was then calcined for 2 hours at a temperature of 950° to 975°C.

Chemical composition:

| | Per cent |
|---|---|
| Zinc oxide | 35 |
| Aluminum oxide | 65 |

The pigment was very white, had a soft texture and a tinting-strength of 35 compared with white lead standard taken as 100.

EXAMPLE 8.—*Normal zinc aluminate*

A mixture of 81.4 parts of zinc oxide and 157 parts of aluminum hydrate, equivalent to 102 parts of aluminum oxide was thoroughly blended by wet-milling for 2 hours and the charge dewatered and dried. The dried mixture was then calcined at a temperature of 800° C.

After calcining for 30 hours the product showed by analysis 3.27% free zinc oxide.

After calcining for 55 hours at 800° C. the product contained by analysis only a trace of free zinc oxide thus showing complete formation of zinc aluminate.

EXAMPLE 9.—*Normal zinc aluminate*

An equimolecular mixture of zinc oxide and aluminum hydrate was prepared as described in Example 8. The dry mixture was then calcined at a temperature of 750° C.

After calcining for 53 hours the product contained 6.02% of zinc oxide soluble in cold 10% acetic acid, indicating that amount of free or uncombined zinc oxide.

After calcining for 101 hours at 750° C. the product contained by analysis 1.08% zinc oxide soluble in cold 10% acetic acid thus showing substantially complete formation of zinc aluminate at 750° C.

My pigmentary zinc aluminate, when prepared as described, are exceptionally white, fine-grained products having a soft texture and excellent opacity or hiding power. The soft texture is attributable to fine particle size. I have found that my zinc aluminate pigments, as discharged from the calcining furnace, consist preponderatingly of separate particles having average diameters less than 1.5 microns with very few, if any, larger than 4 microns. If the products are milled after calcining they will contain very little, if any, material above 1.5 microns.

In this specification and claims I have used the term "pigmentary zinc aluminate" to distinguish my product made with gamma aluminum oxide and having fine particle size, soft texture and high opacity or hiding power, from zinc aluminate in the physical form of zinc spinel, which, even after milling to a fine powder, consists preponderatingly of large compact particles having average diameters of 5 to 10 microns and an opacity or hiding power of approximately 10 compared to white lead standard taken as 100.

My pigmentary zinc aluminate pigments, having properties as heretofore described and shown by examples, I have found are applicable for use in oil, enamel and lacquer type paints and for other purposes where white pigments are used, such as for rubber, paper, filling and coating, linoleum and other floor coverings, printing inks, vitrified enamels, etc.

In the field of paints for exterior use much investigation has been conducted for many years in an effort to combine the best features of the various opaque white pigments, but while much progress has been made, the improvement in one feature has too often been accompanied by a loss of other desirable qualities. White lead carbonate has heretofore been the only white opaque which, without admixture of other pigments, will make a reasonably satisfactory exterior paint with a linseed oil vehicle. Zinc oxide desirably hardens the paint film, but when used without admixture of other pigments will check and crack: admixture with white lead is the usual practice. Lithopone pigment because chemically unstable to atmospheric influences fails rapidly and is little used in high-grade exterior paints. Titanium pigments are in great demand for their excellent hiding power, but fail rapidly by chalking when used alone in exterior paints. The manufacturers of titanium pigments recommend admixture of titanium pigments with white lead, zinc oxide, or both, thus improving the paint to a certain extent. However, titanium pigments with white lead and linseed oil vehicle, while durable, rapidly accumulate dirt and mildew. The addition of zinc oxide prevents dirt collection and mildew, but in a short time leads to chalking and consequent fading of tinted paints. Chalking and fading of tinted paints also occurs within a short time when mixtures of titanium pigments and zinc oxide are used with a linseed oil vehicle.

I have found my zinc aluminate pigments especially suitable as a pigment for exterior paint. Zinc aluminate paints made with a linseed oil vehicle are remarkably durable when exposed to light and weather. The surfaces while resistant to chalking are quite free from dirt collection and do not check and crack upon long exposure.

I have also found that the durability of exterior paints made with a mixture of pigments is greatly improved where zinc aluminate is present; the improvement being roughly proportional to the amount of zinc aluminate in the mixture. Particularly definite improvement has been noted with combinations containing about 50% of zinc aluminate in combination with titanium pigment, and also with white lead, zinc oxide and lithopone pigments. The zinc aluminate pigments may also be used advantageously with a plurality of pigments in exterior paints.

I claim as my invention:

1. The method of making an opaque, white pigmentary normal zinc aluminate which consists in heating an intimate equimolecular mixture of zinc oxide and aluminum hydrate within the temperature range 750° C. to 950° C. until said normal zinc aluminate is formed in the solid phase.

2. The method of making an opaque, white, pigmentary normal zinc aluminate which consists in heating an intimate equimolecular mixture of zinc oxide and aluminum hydrate within the temperature range 925° C. to 1400° C. until said normal zinc aluminate is formed in the solid phase and finally milling the calcined product.

3. An essentially pure, white, pigmentary zinc aluminate having a soft texture, fine particle size, being substantially free from particles over 4 microns average diameter and having a tinting-strength of not less than 30 compared to white lead standard taken as 100.

4. An essentially pure, white, zinc aluminate pigment consisting of 35% to 60% zinc oxide and the balance aluminum oxide, and containing not less than 70% chemically combined zinc and aluminum oxides, calculated as normal zinc aluminate, $ZnAl_2O_4$; such pigment having a soft texture, a fine particle size, being substantially free from particles over 4 microns average diameter and having a tinting-strength of not less than 30 compared to white lead standard taken as 100.

5. A white normal zinc aluminate pigment consisting of equimolecular proportions of chemically combined zinc and aluminum oxides; such pigment having a soft texture, fine particle size, being substantially free from particles over 4 microns average diameter and having a tinting-strength of not less than 40 compared to standard white lead taken as 100.

6. An opaque, white, zinc aluminate pigment consisting of equimolecular proportions of chemically combined zinc and aluminum oxides and having a specific gravity not greater than 4.50.

7. The method of making an essentially pure, opaque, white, pigmentary zinc aluminate which consists in making an intimate mixture of zinc oxide and gamma aluminum oxide and then heating the mixture in the temperature range 750° C. to 1400° C. until said zinc aluminate is formed.

8. The method of making an essentially pure, opaque, white, pigmentary zinc aluminate which consists in making an intimate mixture of zinc and aluminum compounds which upon heating to a temperature of 900° C. yield respectively as solid residues only zinc oxide and gamma aluminum oxide and then heating the mixture in the temperature range 750° C. to 1400° C. until said zinc aluminate is formed.

9. The method of making an essentially pure, opaque, white, pigmentary zinc aluminate which consists in making an intimate mixture of zinc oxide and gamma aluminum oxide and then heating the mixture in the temperature range 750° C. to 950° C. until said zinc aluminate is formed.

10. The method of making an essentially pure, opaque, white, pigmentary zinc aluminate which consists in making an intimate mixture of zinc and aluminum compounds which upon heating to a temperature of 900° C. yield respectively as solid residues only zinc oxide and gamma aluminum oxide and then heating the mixture in the temperature range 750° C. to 950° C. until said zinc aluminate is formed.

11. The method of making an essentially pure, opaque, white, pigmentary zinc aluminate which consists in making a mixture of zinc compounds which upon heating yield only zinc oxide as a solid residue and aluminum compounds which upon heating to 900° C. yield, as a solid residue, only gamma aluminum oxide and then heating the mixture in the temperature range 750° C. to 1400° C. until the oxides chemically combine in the solid phase to form said zinc aluminate pigment.

12. The method of making an essentially pure, opaque, white, pigmentary zinc aluminate which consists in making a mixture of zinc compounds which upon heating yield only zinc oxide as a solid residue and aluminum compounds which upon heating to 900° C. yield, as a solid residue, only gamma aluminum oxide and then heating the mixture in the temperature range 750° C. to 950° C. until the oxides chemically combine in the solid phase to form said zinc aluminate pigment.

LOUIS E. BARTON.